United States Patent
Keckes

(10) Patent No.: US 9,529,450 B2
(45) Date of Patent: Dec. 27, 2016

(54) COATED COMPONENT

(71) Applicant: Oerlikon Surface Solutions AG, Trubbach, Trubbach (CH)

(72) Inventor: Antal Keckes, Gottmadingen (DE)

(73) Assignee: OERLIKON SURFACE SOLUTIONS AG, PFAFFIKON, Pfaffikon SZ (CH)

( * ) Notice: Subject to any disclaimer, the term of this patent is extended or adjusted under 35 U.S.C. 154(b) by 0 days.

(21) Appl. No.: 14/413,813

(22) PCT Filed: Jun. 24, 2013

(86) PCT No.: PCT/EP2013/001854
§ 371 (c)(1),
(2) Date: Jan. 9, 2015

(87) PCT Pub. No.: WO2014/008985
PCT Pub. Date: Jan. 16, 2014

(65) Prior Publication Data
US 2015/0205371 A1 Jul. 23, 2015

(30) Foreign Application Priority Data
Jul. 11, 2012 (DE) .................. 10 2012 013 685

(51) Int. Cl.
*G06F 3/042* (2006.01)
*G06F 3/03* (2006.01)
*G06F 3/0354* (2013.01)

(52) U.S. Cl.
CPC ......... *G06F 3/0304* (2013.01); *G06F 3/03547* (2013.01); *G06F 3/042* (2013.01)

(58) Field of Classification Search
CPC ..... G06F 3/042; G06F 3/0304; G06F 3/03547
See application file for complete search history.

(56) References Cited

U.S. PATENT DOCUMENTS

2010/0079411 A1 4/2010 Lee
2012/0026093 A1* 2/2012 Duparre ............. G06F 3/03547
                                                          250/221
2012/0133583 A1 5/2012 Ramrattan

FOREIGN PATENT DOCUMENTS

DE    10 2009 043 800 A1    4/2010
DE    10 2009 025950 A1    12/2010
EP         2 383 364 A1    11/2011

OTHER PUBLICATIONS

International Search Report for PCT/EP2013/001854 dated Sep. 19, 2013.

* cited by examiner

*Primary Examiner* — Christine Sung
(74) *Attorney, Agent, or Firm* — Pearne & Gordon LLP

(57) ABSTRACT

The invention concerns an infrared sensor, in particular an optical finger navigation module, with a component used as a cover glass for the sensor, the component comprising a sensor region and a transparent region, the transparent region comprising a thin layer system which is at least partially transparent for visible light and comprises at least one layer, and the at least one layer being a metal layer, a semiconductor layer and/or a combination of a plurality of metals and/or a plurality of semiconductors, or comprising a combination of at least one metal and at least one semiconductor, characterized in that both the sensor region and the transparent region are covered with a UV-hardening hardened lacquer layer.

8 Claims, 2 Drawing Sheets

COATED COMPONENT

The invention concerns an optical finger navigation (OFN) module. Such sensors are used for example in mobile telephones. In this respect, according to one embodiment, such a sensor functions essentially as infrared video camera that records the movement of a finger tip and converts the latter as movement of the cursor. DE102009043800A1 describes such a module that is based on the light from an IR light source being reflected onto a finger and recorded as a reflection. Consecutive digital images are compared with one another in order to compute movement information.

The corresponding sensors are covered in many cases with a polycarbonate cover plate and protected from the environment. If in this context, if one wishes to impart a metallic finish to at least parts of the corresponding surface, in order for example to achieve a day-night design, the difficulty arises that even with a low thickness, metallic layers are no longer transparent to IR rays. According to the state of the art, those areas through which the IR radiation is to pass through are masked prior to coating.

Such components are typically produced in such a way that the component is first masked as described above. Then a thin Al layer is applied, for example by means of the physical evaporation technique in a vacuum. After evaporation, the mask is removed and a clear two-component (2C) lacquer is applied for the protection of the surface, i.e. of the component's uncoated surface areas as well as its surface areas coated with aluminum. Such a 2C lacquer is essentially a mixture of hard lacquer and base lacquer. Shortly before application, these two components are mixed. In this process, the mixture must contain a high percentage of solvent (40% vol-50% vol) in order to sufficiently reduce the viscosity. The drawback in this respect is that these solvents can attack the underlying substrate. Admittedly, the component is to exhibit a chrome look. However, so far it has been necessary to resort to aluminum since the 2C lacquer cannot be applied on a chromium surface. The chrome look is achieved according to the state of the art in that before applying the clear 2C lacquer and sometimes prior to removing the mask, an adhesive layer 2C lacquer is applied onto the Al surface. A second 2C clear lacquer layer is applied in order to increase the abrasion resistance. The drawback is that this is an elaborate 3-layer system with correspondingly high reject rates and production costs.

The present invention has the task of overcoming or at least partially mitigating the above-mentioned disadvantages.

According to the invention, this aim is achieved in that instead of the 2C lacquer, a UV-curing lacquer with a high solid content is used. This makes it possible to use corrosion-resistant chromium and only having to apply one UV protective lacquer layer for the high constant stress exposure. The production costs are thus significantly reduced and the costs lowered. The UV lacquer furthermore has the advantage that it contains a considerably lower percentage of solvent as compared with the 2C lacquer and thus the underlying substrate as well as the environment are protected.

The invention will now be described in detail on the basis of an embodiment by way of example.

Figure 1:
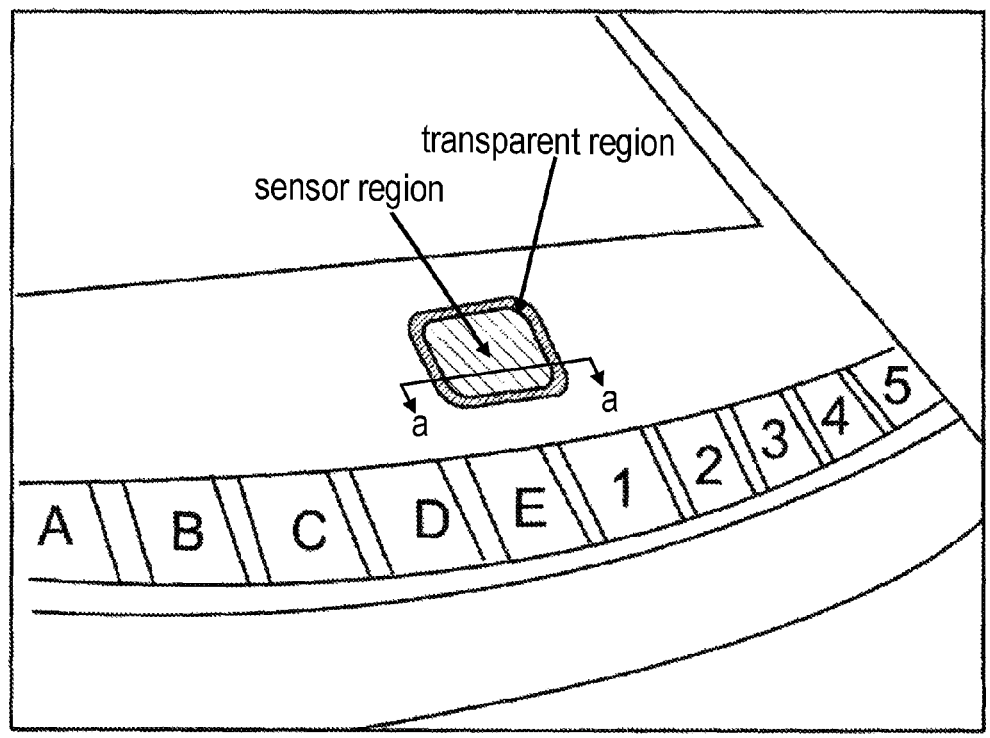
FIG. 1 shows a detail of a mobile telephone with optical finger navigation (OFN) module in the central area.
Figure 2:
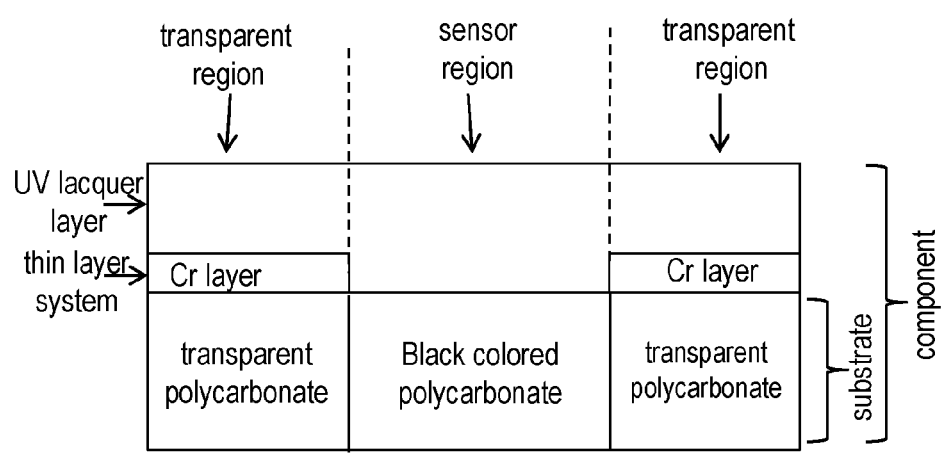
FIG. 2 shows a cross-sectional view of the OFN in FIG. 1 along line a-a.

The OFN shown in FIG. 1 comprises a central region and a border. The central region is black, the border should in daylight have a chrome look and in insufficient ambient light conditions be backlit. The border must therefore be at least partially transparent for visible light. In order to enable the OFN function, the central region must be transparent for infrared radiation. In the sense of the present invention, infrared radiation applies to radiation with a wavelength greater than 780 nm and preferably lower than 1400 nm.

Black-colored polycarbonate is used for the central region, transparent polycarbonate is used for the border. These can be sprayed together. After spraying, the component is cleaned in an ultrasound bath and afterwards dried. The central region is then covered, i.e. masked, for example by means of masking tape, since it is not supposed to be coated with a metallic layer. The masking only leaves the edge free.

The component is then coated with chromium in a coating facility. Physical vapor deposition (PVD) is for example suitable, such as for example sputtering or arc evaporation. Since magnetron sputtering can be performed at relatively low temperatures (below 150° C., partly also below 100° C.), this process carried out under vacuum is particularly suited. The masking material should accordingly be vacuum-compatible.

The applied chromium layer should not be too thick, in order to exhibit sufficient transparency for visible light for the night lighting. The chromium layer should however also not be too thin, in order to have the desired chrome look by daylight. A chromium layer thickness of approx. 20 nm has proven advantageous. This is applied with the above-mentioned method.

After the PVD coating, the mask is removed. This can occur for example by means of solvents, e.g. acetone. After the mask has been removed, the surface is blown down and de-ionized. Subsequently, an approx. 20 μm thick UV lacquer layer is applied, followed by drying for example by means of IR heat radiation and UV curing. The duration for the UV curing is on the order of one minute.

Due to the UV lacquer, both the underlying black substrate in the central area as well as the underlying thin chromium layer in the border area are protected against corrosion. Furthermore, the scratch resistance is increased and the propensity to soiling in respect of the fingerprints is reduced.

The component thus produced is then used as cover glass for an infrared sensor.

An infrared sensor has been disclosed and in particular an optical finger navigation module, with a component used as a cover glass for the sensor, the component comprising a sensor region and a transparent region, the transparent region comprising a thin layer system which is at least partially transparent for visible light and comprises at least one layer, and the at least one layer being a metal layer, a semiconductor layer and/or a combination of a plurality of metals and/or a plurality of semiconductors, or comprising a combination of at least one metal and at least one semiconductor, characterized in that both the sensor region as well as the transparent region are covered with a UV-hardening hardened lacquer layer.

The infrared sensor can be characterized in that the at least one layer comprises chromium and is preferably a chromium layer.

The infrared sensor can be characterized in that the one layer has a thickness of 20 nm.

The infrared sensor can be characterized in that the one layer has an adhesive layer lying directly on the substrate and a following functional layer.

What is claimed is:

1. Infrared sensor with a component used as a cover glass for the sensor, the component comprising a sensor region and a transparent region, the transparent region comprising a thin layer system which is at least partially transparent for visible light and comprises at least one layer, and the at least one layer being a metal layer, a semiconductor layer and/or a combination of a plurality of metals and/or a plurality of semiconductors, or comprising a combination of at least one metal and at least one semiconductor, characterized in that both the sensor region as well as the transparent region are covered with a UV-hardening hardened lacquer layer, wherein the sensor region being a central region made of black colored polycarbonate and transparent for infrared radiation, and the transparent region being a border region made of transparent polycarbonate and at least partially transparent for visible light.

2. Infrared sensor according to claim 1, characterized in that the at least one layer comprises chromium.

3. Infrared sensor according to claim 2, characterized in that the at least one layer has a thickness of 20 nm.

4. Infrared sensor according to claim 2, characterized in that the at least one layer has an adhesive layer lying directly on a substrate and a following functional layer.

5. Infrared sensor according to claim 2, wherein the at least one layer comprises a chromium layer.

6. Infrared sensor according to claim 1, wherein the infrared sensor comprises an optical finger navigation module.

7. Infrared sensor according to claim 1, wherein at least one layer comprises a metal layer, a semiconductor layer and/or a layer combining a plurality of metals and/or a plurality of semiconductors is a PVD deposited layer.

8. Infrared sensor according to claim 1, wherein a thickness of the UV-hardening hardened lacquer layer is approximately 20 μm.

* * * * *